United States Patent
Aoyama

(10) Patent No.: US 6,413,491 B1
(45) Date of Patent: Jul. 2, 2002

(54) REFORMER, METHOD OF REFORMING, AND FUEL CELL SYSTEM EQUIPPED WITH THE REFORMER

(75) Inventor: Satoshi Aoyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/465,699

(22) Filed: Dec. 17, 1999

(30) Foreign Application Priority Data

Jan. 13, 1999 (JP) .......................................... 11-006375

(51) Int. Cl.$^7$ ........................... C01B 3/24; C01B 31/18; C01B 31/20; B01J 12/00
(52) U.S. Cl. ........................ 423/650; 252/373; 422/197; 423/418.2; 423/437.1; 429/12
(58) Field of Search .............................. 423/418.2, 650, 423/651, 652, 437.1; 252/373, 376; 422/197, 236; 429/12

(56) References Cited

U.S. PATENT DOCUMENTS

| 5,112,578 A | 5/1992 | Murayama et al. ......... 422/197 |
| 5,588,974 A | 12/1996 | Tiller et al. ................. 48/127.9 |
| 5,980,596 A | 11/1999 | Hershkowitz et al. ..... 48/127.9 |
| 6,207,122 B1 * | 3/2001 | Clawson et al. ......... 423/418.2 |

FOREIGN PATENT DOCUMENTS

| JP | A-63-129002 | 6/1988 | ............. C01B/3/38 |
| JP | A-6-206702 | 7/1994 | ............. C01B/3/38 |
| JP | A-9-315801 | 12/1997 | ............. C01B/3/38 |
| WO | WO 98/49096 | 11/1998 | ............. C01B/3/38 |

* cited by examiner

Primary Examiner—Steven P. Griffin
Assistant Examiner—Maribel Medina
(74) Attorney, Agent, or Firm—Oliff & Berridge PLC

(57) ABSTRACT

A partial oxidation reforming reaction occurs at the center of a chamber in a reformer, while a steam reforming reaction occurs in a localized manner around the chamber center. Thus, the efficiency of the reforming reaction is improved while keeping a temperature in the vicinity of an outer chamber wall low. Oxygen is supplied from an inlet center of the reformer so as to enhance a concentration of oxygen in a central area of the chamber. On the other hand, steam is supplied along an outer wall of the chamber so as to enhance a concentration of steam in an outer peripheral area of the chamber. When a hydrocarbon raw material is reformed in this state, a partial oxidation reforming reaction, which is an exothermic reaction, mainly occurs in the central area, while a steam reforming reaction, which is an endothermic reaction, tends to occur in the outer peripheral area surrounding the central area. Thus, in the central area, the partial oxidation reformation can be promoted by reaction heat that is generated. On the other hand, in the outer peripheral area, when the reaction heat produced in the central area diffuses, the reaction heat is absorbed so as to improve the efficiency of the steam reforming reaction while keeping a temperature of the vicinity of the outer wall low.

15 Claims, 13 Drawing Sheets

STEAM REFORMATION: $CH_4 + H_2O \Leftrightarrow 3H_2 + CO$
$CO + H_2O \Leftrightarrow H_2 + CO_2$ $\begin{cases} \text{PARTIAL OXIDATION REFORMATION:} & CH_4 + 1/2 O_2 \Leftrightarrow 2H_2 + CO \\ \text{STEAM REFORMATION} & CH_4 + H_2O \Leftrightarrow 3H_2 + CO \\ & CO + H_2O \Leftrightarrow H_2 + CO_2 \end{cases}$

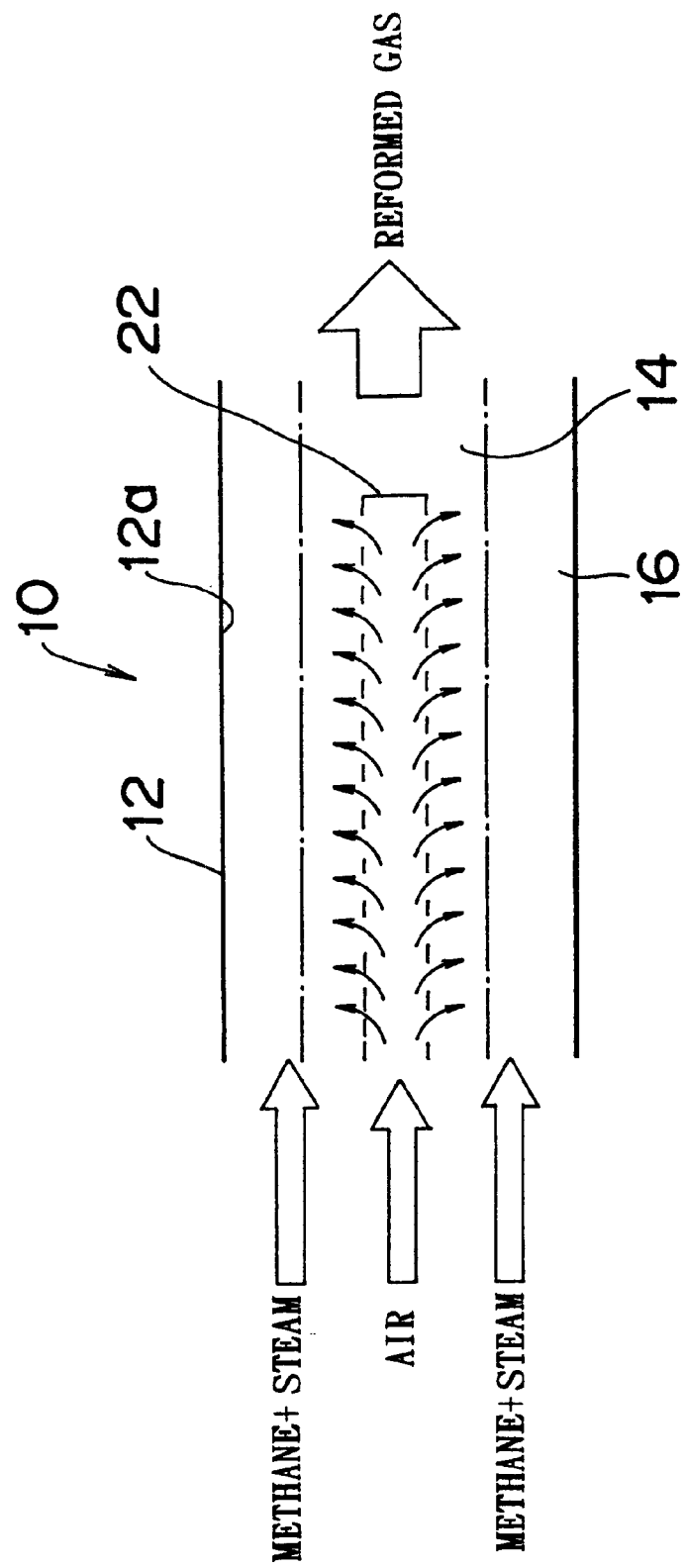

PARTIAL OXIDATION REFORMATION

EXOTHERMIC REACTION
$CH_4 + 1/2 O_2 \rightarrow 2H_2 + CO$

DISTANCE FROM CENTER OF REFORMER (IN RADIAL DIRECTION)

REACTION AMOUNT

STEAM REFORMATION

ENDOTHERMIC REACTION
$CH_4 + H_2O \rightarrow 3H_2 + CO$

DISTANCE FROM CENTER OF REFORMER (IN RADIAL DIRECTION)

REACTION AMOUNT

REFORMER, METHOD OF REFORMING, AND FUEL CELL SYSTEM EQUIPPED WITH THE REFORMER

INCORPORATION BY REFERENCE

The disclosure of Japanese Patent Application No. HEI 11-006375 filed on Jan. 13, 1999, including the specification, drawings and abstract is incorporated herein by reference in its entirety.

BACKGROUND OF THE INVENTION

1. Field of Invention

The present invention relates to a reformer for reforming a hydrocarbon raw material such as methane, methanol and the like, to produce hydrogen. More particularly, the present invention relates to an improvement in a reformer that combines a steam reforming method with a partial oxidation reforming method. The present invention also relates to a reforming method and to a fuel cell system.

2. Description of Related Art

In general, a fuel cell is a device that uses oxygen and hydrogen as fuels and converts the chemical energy contained in these fuels directly into electric energy without converting it into thermal energy. The fuel cell has an excellent characteristic in terms of the environment, and is capable of achieving a high energy efficiency. Therefore, the development of a fuel cell as a future energy supplying system has been under way extensively.

When the aforementioned fuel cell is used as a generator, in terms of economy, it would be ideal to use natural gas, naphtha and an alcohol component which is methanol, as fuel gases containing hydrogen. However, at the moment, there is no fuel cell that can efficiently generate electricity by directly supplying these fuel gases to a battery. For this reason, many current fuel batteries are equipped with a reformer for producing a fuel gas from a hydrocarbon raw material. In this reformer, the aforementioned natural gas, methanol and the like are reformed so as to produce a fuel gas that is supplied to an anode.

One of the reforming methods in such a reformer is a steam reforming method. In this steam reforming method, a hydrocarbon raw material is reformed by means of steam so as to produce hydrogen. As one example, a chemical reaction (1) that occurs when performing steam reformation using methanol as a raw material is shown below.

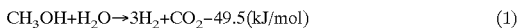

$$CH_3OH + H_2O \rightarrow 3H_2 + CO_2 - 49.5 (kJ/mol) \quad (1)$$

As can be seen from the formula shown above, this steam reforming reaction is an endothermic reaction. Thus, when performing steam reformation, a burner, a heater and the like are additionally installed in the reformer so as to supply an amount of heat required for the reforming reaction. However, providing the reformer with a burner and a heater increases the size and complexity of the reforming portion, which is problematic.

Hence, a reformer that can eliminate such a problem has been developed as disclosed in Japanese Patent Application Laid-Open No. HEI 9-315801. This reformer additionally makes use of a partial oxidation reforming reaction, which is a raw material reforming method different from the aforementioned steam reforming method. In a partial oxidation reforming method, a hydrocarbon raw material such as methanol is partially oxidized by means of oxygen so as to produce hydrogen and a great amount of reaction heat, which is discharged at the same time. A reaction (2) wherein methanol is subjected to partial oxidation reformation so as to produce hydrogen is shown below.

$$CH_3OH + \tfrac{1}{2}O_2 \rightarrow 2H_2 + CO_2 + 189.5 (kJ/mol) \quad (2)$$

According to this reformer, the partial oxidation reformation that produces such a great amount of heat is performed in a single reformer, thereby supplying an amount of heat required for steam reformation. In such a system, since there is no need to additionally install a heating device, it is possible to prevent size increase and complexity of the device. Further, since thermal energy is produced within the reformer instead of being produced outside the reformer, the amount of heat absorbed by an outer wall and the like of the reformer can be reduced. Therefore, the energy efficiency is also improved. Furthermore, the partial oxidation reformation not only supplies an amount of heat required for steam reformation but also produces hydrogen at the same time. Thus, the partial oxidation reformation is also advantageous in producing hydrogen.

The aforementioned partial oxidation reforming reaction and steam reforming reaction are equilibrium reactions, which depend on temperature. That is, these reactions proceed in a direction that produces hydrogen if the temperature rises, and cause a reaction that restores a raw material from hydrogen if the temperature falls. Hence, in order to cause these equilibrium reactions to proceed in the direction that produces hydrogen, the temperatures of the respective reactions need to be raised to suitable reaction temperatures.

However, in the case of the previously described reformer that combines steam reformation with partial oxidation reformation, the steam reforming reaction and the partial oxidation reforming reaction are performed randomly in the reformer. In such a case, the heat generated through the partial oxidation reformation is homogenized in the entire reformer and absorbed by the steam reformation that is occurring nearby. For this reason, the previously employed reformer needs to be maintained at a high temperature to enhance the efficiency of both the reactions, for example, at 700° C. or 800° C.

In addition, in order to maintain the interior of the reformer at a high temperature, an expensive heat-resistant material needs to be used for an outer wall member constituting the reformer, which makes an increase in cost inevitable.

SUMMARY OF THE INVENTION

The present invention has been made in light of the aforementioned problems. It is an object of the present invention to enhance an efficiency of reformation in a reformer that combines steam reformation with partial oxidation reformation, while maintaining an outer wall at a relatively low temperature.

In order to achieve the above and/or other objects, according to a first aspect of the present invention, there is provided a reformer that combines a steam reforming reaction, in which a hydrocarbon raw material is reformed into hydrogen using steam, with a partial oxidation reforming reaction, in which a hydrocarbon raw material is reformed into hydrogen using oxygen. In a chamber of the reformer, an oxygen supply amount is reduced from a center of the chamber toward an inner surface of an outer wall of the chamber, and a steam supply amount is reduced from the inner surface of the outer wall toward the center. Thus, a partial oxidation reaction takes place in the vicinity of a central area of the chamber, whereas steam reformation takes place in the vicinity of an outer peripheral area of the chamber, which surrounds the central area.

According to the aforementioned aspect of the invention, the reaction heat generated through the partial oxidation reformation, which is an exothermic reaction performed in the central area, is utilized by the steam reforming reaction in the outer peripheral area. Hence, a temperature distribution pattern is formed in the reformer, and the temperature gradually becomes lower from the central portion of the chamber toward the inner surface of the outer wall of the chamber. Thus, it becomes possible to keep a temperature of the outer wall low. In other words, when the temperature of the outer wall needs to be maintained at the same reaction temperature as in the related art, for example, at 700° C., the reformer of the present invention makes it possible to maintain the central portion at a higher temperature. As a result, the efficiency of the reforming reaction is improved. Also, in order to achieve the same reaction efficiency as in the related art, the reforming reaction can be performed with the temperature of the outer wall being kept lower in comparison with the outer wall temperature of the related art.

Further, according to the aforementioned aspect of the invention, an oxygen supply may include a blowout portion for supplying oxygen through blowout in the vicinity of the center of the chamber, and oxygen may be supplied from the vicinity of the center of the chamber toward the inner surface of the outer wall.

According to the aforementioned aspect of the invention, oxygen is blown out from the blowout portion, whereby it becomes possible to securely form a gradient of an oxygen supply amount from the center of the chamber toward the inner surface of the outer wall. Thus, the partial oxidation reformation is efficiently performed in the vicinity of the center of the reformer chamber. On the other hand, it is possible to gradually reduce the ratio of the partial oxidation reformation and increase the ratio of the steam reformation toward the inner surface of the outer wall (i.e., toward the outer periphery of the chamber). Further, since the blowout portion is located at the center, a stream from the center toward the inner surface of the outer wall is formed when supplying oxygen from the blowout portion. This stream shifts the reaction heat toward the outer peripheral area, and this reaction heat is efficiently utilized for the steam reforming reaction that takes place in the outer peripheral area.

Furthermore, according to the aforementioned aspect of the invention, steam of a high partial pressure may be supplied to the vicinity of the inner surface of the outer wall.

In the outer peripheral area where the steam reformation is performed, the more distant an area is located from the central area where the partial oxidation reformation is performed, the more the temperature and the efficiency of the steam reformation in that area tend to fall. However, according to an aspect of the present invention, the partial pressure of the steam in the vicinity of the inner surface of the outer wall is enhanced, whereby the equilibrium reaction of steam reformation proceeds in such a direction as to produce hydrogen. Thus, even if the temperature has fallen, it is possible to achieve a high reformation rate.

Further, according to a reforming method of an aspect of the present invention, in a reformer having an internal chamber formed by an outer wall, a steam reforming reaction in which a hydrocarbon raw material is reformed into hydrogen using steam and a partial oxidation reforming reaction in which a hydrocarbon raw material is reformed into hydrogen using oxygen are performed. According to this method, in the internal chamber of the reformer, the amount of oxygen is reduced from the center of the internal chamber toward the inner surface of the outer wall, whereas the amount of steam is reduced from the inner surface of the outer wall toward the center of the chamber. Thus, the partial oxidation reforming reaction is performed in the vicinity of the central area of the internal chamber, whereas the steam reforming reaction is performed in the vicinity of the outer periphery of the internal chamber.

According to the aforementioned aspect of the invention, the reaction heat generated through the partial oxidation reformation, which is an exothermic reaction performed in the central area of the internal chamber, is utilized for the steam reforming reaction performed in the vicinity of the outer periphery of the internal chamber. Thus, a certain temperature distribution pattern is formed in the reformer. The temperature gradually becomes lower from the central portion of the internal chamber toward the inner surface of the outer wall, whereby it becomes possible to maintain the outer wall at a relatively low temperature.

In the reformer and reforming method of this aspect of the present invention, the partial oxidation reaction is performed in the vicinity of the central area, and the steam reformation is performed in the vicinity of the outer periphery of the chamber, which surrounds the central area. However, some partial oxidation reactions also require steam. Therefore, in addition to the partial oxidation reaction, the steam reforming reaction may partially be performed in the vicinity of the central area of the chamber.

A fuel cell system of an aspect of the present invention includes the reformer described above and a fuel cell that generates electricity by being supplied with reformed gas that is produced through a reforming reaction in the reformer. According to such a fuel cell system, the steam reforming reaction, which is an endothermic reaction, is performed with the aid of the heat generated through the partial oxidation reforming reaction of the hydrocarbon raw material. Therefore, it is possible to reduce an amount of heat that is supplied from outside of the fuel cell system, so as to supply an amount of heat required for the reforming reaction. Thus, there is no need to provide a source of heat for supplying an amount of heat required for the reforming reaction. In addition, in the reformer used in the fuel cell system, the partial oxidation reaction, which is an exothermic reaction, is performed in the central area of the chamber, and the steam reforming reaction, which is an endothermic reaction, is performed in the outer periphery of the chamber. Thereby, the reaction heat generated in the central area is absorbed as an amount of heat required for the steam reforming reaction when diffusing toward the inner surface of the outer chamber wall. Hence, it becomes possible to maintain the outer periphery at a relatively low temperature. Accordingly, without using an expensive heat-resistant material for the outer wall, a certain temperature distribution pattern is formed in the reformer, so that the efficiency of the reforming reaction can be improved. Thus, the fuel cell system of the present invention makes it possible to prevent complexity of the entire system and to enhance the energy efficiency.

BRIEF DESCRIPTION OF THE DRAWINGS

The foregoing and further objects, features and advantages of the present invention will become apparent from the following description of preferred embodiments with reference to the accompanying drawings, in which:

FIG. 4 shows an inner structure of a reformer according to a second embodiment of the present invention;

DETAILED DESCRIPTION OF PREFERRED EMBODIMENTS

Figure 1:
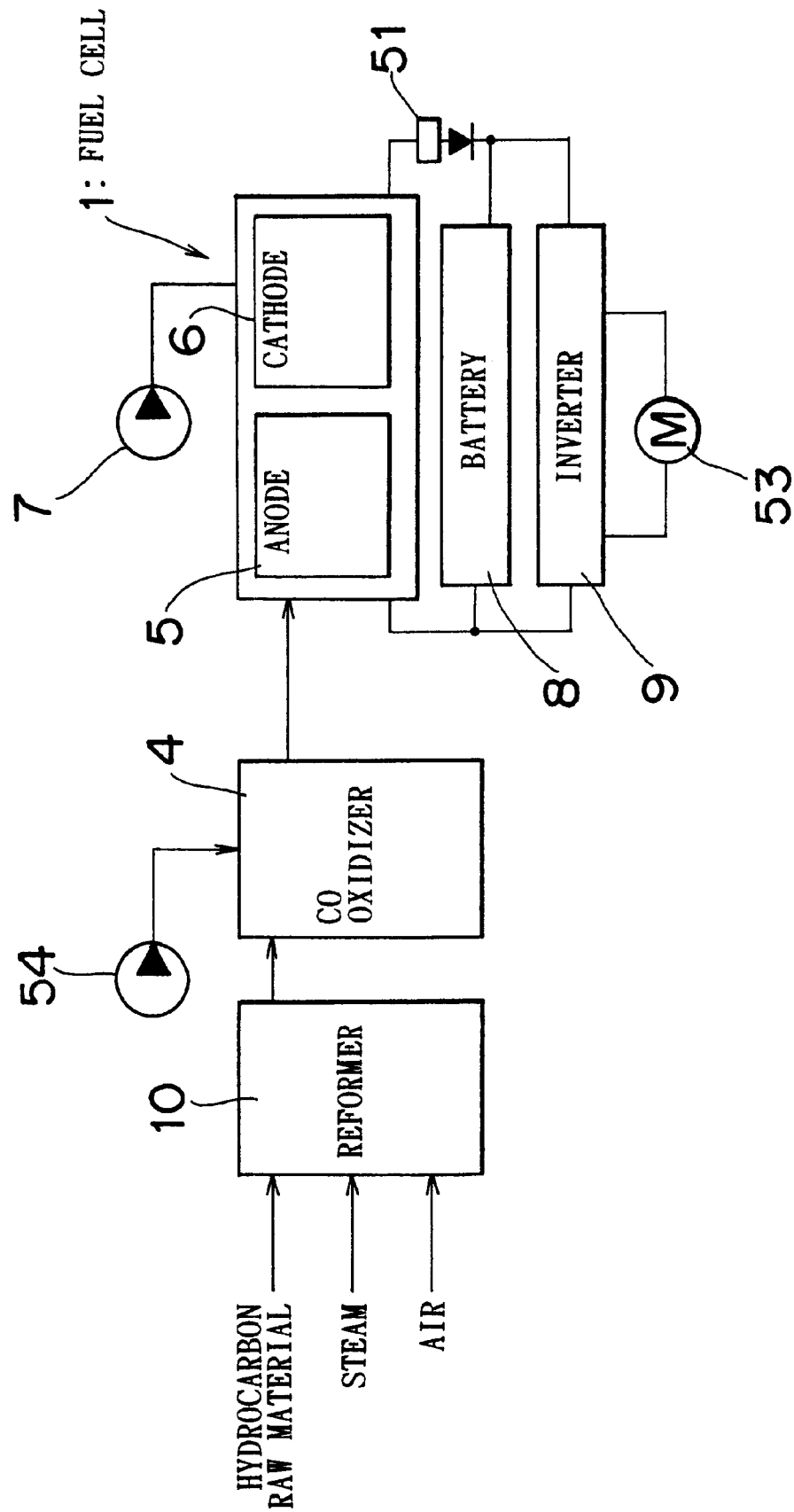
FIG. 1 schematically shows a structure of a fuel cell system according to one preferred embodiment of the present invention.

Preferred embodiments of the present invention will be described hereinafter with reference to the drawings. FIG. 1 schematically shows an example of a structure of a fuel cell system. A reformer 10 is connected to the side of an anode 5 of a fuel cell 1 through a CO oxidizer 4. The reformer 10 reforms a hydrocarbon raw material, which is a reforming fuel, into fuel gas that is mainly composed of hydrogen. As one example, the fuel cell 1 employs a high-molecular film permeable to protons as an electrolyte, and the electrolyte is provided between the anode 5 and a cathode 6. The fuel cell system is constructed by connecting a multitude of thus-structured electric cells in series and in parallel. The anode 5 and the cathode 6 are composed of a diffusion layer and a reaction layer. The reaction layer in the anode 5 has a porous structure in which a catalyst such as platinum, platinum alloy, ruthenium and the like is sandwiched between carbon materials. The reformer 10 is in communication with the anode 5 through the CO oxidizer 4. An air supplying portion (air supply) 7 such as a pump is connected to the cathode 6 so as to supply oxygen that is to react with hydrogen in reformed gas.

A battery 8 and an inverter 9 are connected as external loads to the anode 5 and to the cathode 6 in such a manner as to constitute a closed circuit. A current sensor 51 is incorporated in this closed circuit. Furthermore, a motor 53 is connected to the inverter 9. For example, the motor 53 is used as a power source for driving a vehicle.

In a reforming reaction caused by the reformer 10, carbon monoxide is inevitably generated and mixes with reformed gas. Because the carbon monoxide poisons the catalyst of the anode 5 in the fuel cell 1, the CO oxidizer 4 for reducing carbon monoxide is provided between the reformer 10 and the fuel cell 1. The CO oxidizer 4 is equipped with a CO oxidation catalyst (not shown) and an air supplying portion 15. The CO oxidizer 4 is designed such that the fuel gas produced in the reformer 10 passes therethrough and the oxygen contained in air oxidizes the carbon monoxide contained in the fuel gas.

The construction of the reformer, which constitutes a main aspect of the present invention, will now be described. The reformer 10 has formed therein an internal space (i.e., an internal chamber) which accommodates a catalyst for reforming and the like so as to perform a reforming reaction efficiently. As the catalyst accommodated in the internal space, a catalyst of any type can be employed as long as it can promote the reforming reaction. For example, a nickel-based catalyst, a palladium-based catalyst, a platinum-based catalyst, a rhodium-based catalyst, a ruthenium-based catalyst and the like can be employed. A hydrocarbon raw material is introduced into the inner space of the reformer from an inlet opening (not shown) of the reformer 10. Also, oxygen required for a partial oxidation reaction of the hydrocarbon raw material and hydrogen required for a steam reforming reaction of the hydrocarbon raw material are supplied from an inlet opening of the reformer. Then, fuel gas is produced by a reforming reaction in the reformer. In principle, the fuel gas produced in the reformer 10 is hydrogen gas and carbon dioxide gas. However, in reality, a small amount of carbon monoxide gas (about 1%) is generated. Most of the carbon monoxide gas reacts with the oxygen contained in the air that is supplied from the air supplying portion 15 at the time of passage of reformed gas through the CO oxidizer 4, and becomes carbon dioxide. In this manner, the reformed gas with a high concentration of hydrogen is sent to the anode 5 in the fuel cell 1. In the reaction layer of the anode 5, hydrogen ions and electrons are generated. The hydrogen ions permeate through the electrolyte film and react with oxygen on the side of the cathode 6, thus generating water. The electrons pass through the external loads and generate motive power.

Figure 2:
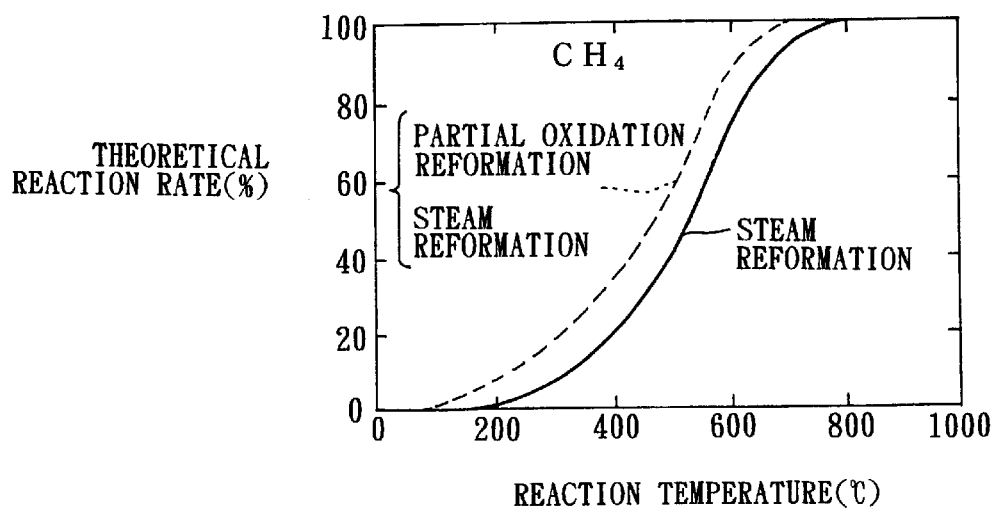
FIG. 2 shows reaction formulas of a steam reforming reaction and of a partial oxidation reaction, and a relationship between temperature and theoretical reaction rate.

The steam reforming reaction and the partial oxidation reforming reaction occurring in the reformer 10 will now be described. FIG. 2 shows a relationship between reaction rate and reaction temperature of the reformer in the form of a relationship between reaction temperature and theoretical reaction rate of a steam reforming reaction and a partial oxidation reforming reaction. Referring to FIG. 2, a broken line represents a case where the partial oxidation reforming reaction is combined with the steam reforming reaction, and a solid line represents the steam reforming reaction. Also, these lines represent a relationship in a case where methane ($CH_4$) is reformed.

As shown in FIG. 2, the reforming reaction is an equilibrium reaction, and the directionality of the steam reforming reaction and the partial oxidation reforming reaction is determined by a reaction temperature or the like. As shown in FIG. 2, in order to cause the reforming reaction to proceed in such a direction as to produce hydrogen, the reaction temperature needs to be enhanced. According to the related art wherein the partial oxidizing reaction and the steam reforming reaction occur homogeneously in the reforming portion, the temperature in the reformer is normally maintained at about 700° C.

Figure 3:
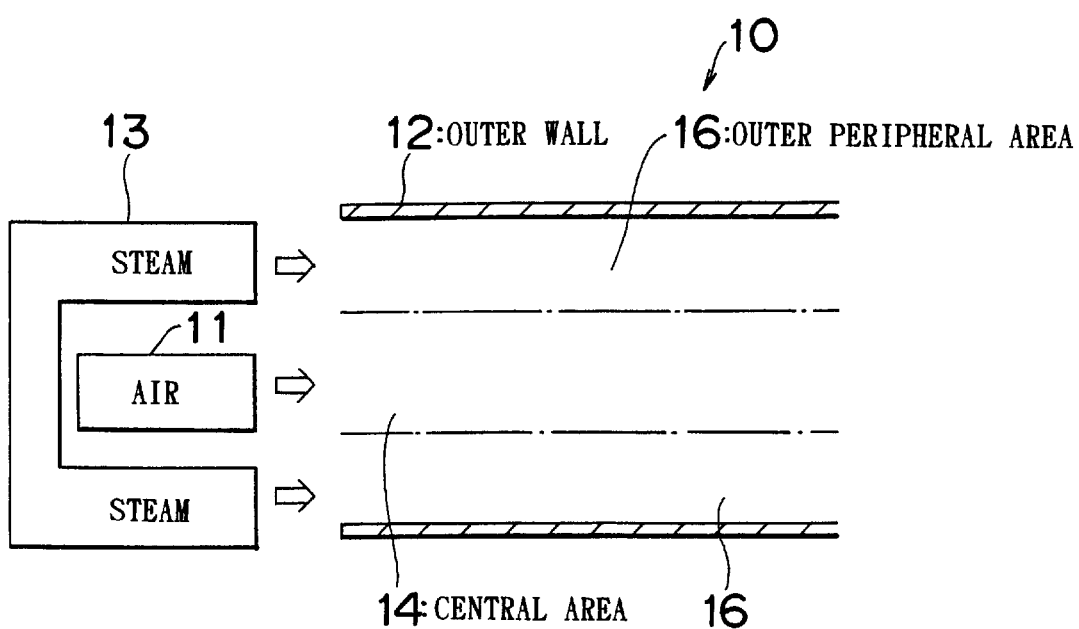
FIG. 3 shows an inner structure of a reformer according to a first embodiment of the present invention.

In the reformer 10 according to the first embodiment of the present invention shown in FIG. 3, the partial oxidation reforming reaction is mainly caused to take place in a central area 14 of the chamber in the reformer, whereas the steam reforming reaction is mainly caused to take place in an outer peripheral area 16 of the chamber in the reformer. Thereby, while keeping the temperature in the vicinity of an inner surface of an outer wall 12 of the reformer chamber at a relatively low temperature, the efficiency of the reforming reaction is improved.

That is, referring to FIG. 3, an air supplying portion (air supply) 11 is installed as an oxygen supplying source at the center of an inlet hole leading to the inner chamber formed within an outer wall 12, so as to enhance a concentration of oxygen in the central area 14 in the reformer 10. A steam supplying portion (steam supply) 13 is installed around the air supplying portion 11, so as to enhance a concentration of steam in the outer peripheral area 16 of the chamber in the reformer 10. In this manner, if the hydrocarbon raw material is reformed while maintaining a state of the reformer 10, the partial oxidation reforming reaction, which is an exothermic reaction, mainly occurs in the central area 14, and the steam reforming reaction, which is an endothermic reaction, tends to occur in the outer peripheral area 16, which surrounds the central area 14.

Accordingly, in the central area 14, the partial oxidation reaction can be promoted by reaction heat that is generated. In the outer peripheral area 16, when the reaction heat produced in the central area 14 diffuses, the efficiency of the steam reforming reaction is improved by absorbing the reaction heat. By thus performing heat exchange inside the reformer 10, the efficiency of both the reactions is improved, and the temperature in the vicinity of the outer peripheral area 16 is kept relatively low.

The operation in performing reformation of methane in the aforementioned reformer 10 is described below.

In this case, methane is used as a hydrocarbon raw material and is reformed into hydrogen. In subjecting methane to steam reformation, there occurs a reaction indicated by a formula (3), whereas in subjecting methane to partial oxidation reformation, there occurs a reaction indicated by a formula (4).

$$CH_4 + H_2O \rightarrow 3H_2 + CO - 206.2 \text{ kJ} \quad (3)$$

$$CH_4 + \tfrac{1}{2}O_2 \rightarrow 2H_2 + CO + 35.7 \text{ kJ} \quad (4)$$

In this case, the heat given off by the partial oxidation reformation is counterbalanced by the heat absorbed by the steam reforming reaction. The ratio between both the reactions is adjusted such that the temperature inside the reformer does not fluctuate due to the reactions occurring therein. The ratio between the steam reforming reaction and the partial oxidation reaction is adjusted by controlling the supply amounts of oxygen and methane. That is, all the oxygen is used to perform the partial oxidation, and any still remaining methane is subjected to the steam reformation. That is, in this case, the amount of supply of oxygen is determined as $O_2/CH_4$ ratio=0.43. The amount of supply of steam is determined as $H_2O/CH_4=3$.

First of all, the internal temperature of the reformer 10 is raised to a reforming temperature, which is equal to, for example, about 700° C. as in the related art, and a raw material is then fed to the reformer 10. Furthermore, with the aforementioned ratios, air is supplied from the air supplying portion 11 to the central area 14, and steam is supplied from the steam supplying portion 13 to the outer peripheral area 16. In the central area 14, the partial oxidation reforming reaction mainly occurs in which 1 mol of methane is reformed and 35.7 kJ of heat is produced at the same time. Thereby, the temperature of the central area becomes equal to or higher than 700° C., and the partial oxidation reaction is promoted.

The reaction heat generated by the partial oxidation reformation in the central area 14 is supplied to the outer peripheral area 16. This reaction heat serves to promote the steam reforming reaction that occurs in the outer peripheral area 16. Because this steam reforming reaction is an endothermic reaction, if the steam reforming reaction is promoted, the reaction heat produced in the central area 14 is absorbed in the outer peripheral area 16. As a result, the temperature of the outer peripheral area 16 becomes equal to or lower than 700° C. Accordingly, the reformer 10 makes it possible to keep the outer wall at a low temperature while maintaining or improving the efficiency of the reforming reaction.

Although not shown, catalyst for reforming and the like are generally accommodated in the internal space of the reformer 10 shown in FIG. 3, so as to improve the efficiency of the reforming reaction. The catalyst may be of any type as long as it can promote the reforming reaction. A certain type of catalyst may be employed in both the outer peripheral area where the steam reformation mainly occurs and in the central area where the partial oxidation reaction mainly occurs. Alternatively, the catalyst employed in the outer peripheral area may be different from the catalyst employed in the central area.

Although the hydrocarbon raw material supply structure is not shown in FIG. 3, the hydrocarbon raw material may be supplied directly to the reformer 10 through a separate supplying portion. Alternatively, the hydrocarbon raw material may also be supplied to the reformer 10 from a hydrocarbon raw material supplying portion through the steam supplying portion 13 and the air supplying portion 11.

In the following embodiments, various modes of supplying hydrocarbon raw material, oxygen and steam to the aforementioned reformer and the operations of those modes will be described.

FIG. 4 shows a structure of a reformer according to a second embodiment of the present invention. The reformer 10 includes a blowout pipe 22 at the center thereof. Through the blowout pipe 22, the air fed from the air supplying portion is radially supplied from the center of the reformer 10 toward the inner surface 12a of the outer wall 12. Accordingly, the concentration of oxygen in the reformer is high in the central area and low in the outer peripheral area 16. On the other hand, methane and steam, which are used as raw materials, are fed toward the inside of the reformer 10 from an outer peripheral portion of an inlet of the reformer 10. Accordingly, the concentrations of methane and steam are high in the outer peripheral area 16 and low in the central area 14.

Figure 5A:
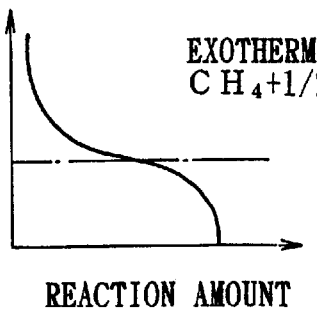
FIG. 5A is a graph showing distribution of a reaction amount of a partial oxidation reaction in the reformer according to the second embodiment.
Figure 5B:
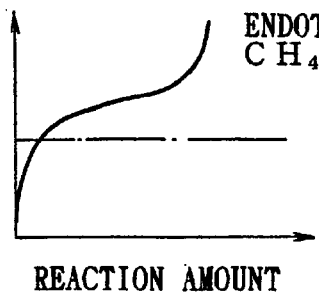
FIG. 5B is a graph showing distribution of a reaction amount of a steam reforming reaction in the reformer according to the second embodiment.
Figure 6:
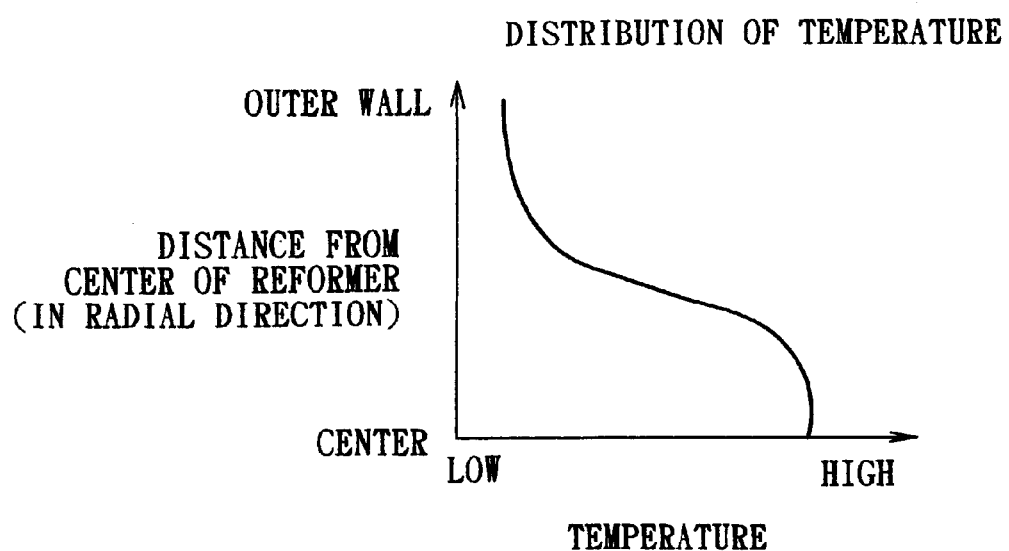
FIG. 6 is a graph showing distribution of temperature in the reformer according to the second embodiment.

FIG. 5A shows distribution of a reaction amount of partial oxidation reformation caused in the reformer 10 in the case where the raw material is reformed with the distribution of concentrations of oxygen and hydrogen being formed as described above. FIG. 5B shows a distribution of a reaction amount of steam reformation caused in the reformer 10 in the case where the raw material is reformed with the distribution of concentrations of oxygen and hydrogen being formed as described above. In each of FIGS. 5A and 5B, the axis of ordinate represents a radial distance from the center of the reformer, and the axis of abscissa represents a reaction amount. As in the first embodiment, the ratios are set such that $H_2O/CH_4=3$ and $O_2/CH_4=0.43$. Furthermore, FIG. 6 shows a distribution of temperature in the reformer at the time of reaction.

As shown in FIG. 5A, in the central area, which has a high concentration of oxygen (in the area below an alternate long and short dash line in the drawing), the partial oxidation reforming reaction of methane actively occurs. In accordance therewith, as shown in FIG. 6, the temperature of the central area rises. This reaction heat is diffused to the outer peripheral area 16 by a current of air blown out from the air blowout pipe 22. In the outer peripheral area 16, this reaction heat is utilized to promote the steam reforming reaction of methane. As a result, as shown in FIG. 6, the temperature in the outer peripheral area falls, and the temperature in the vicinity of the outer wall 12 is kept relatively low.

Figure 7:
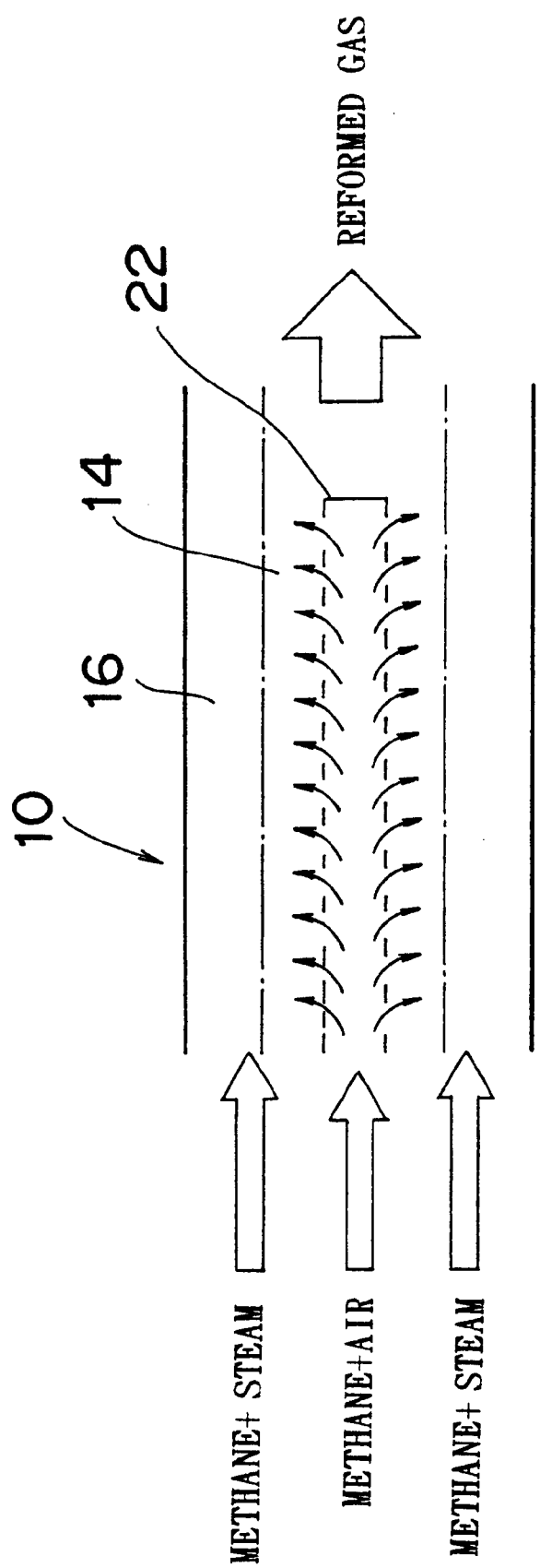
FIG. 7 shows an internal structure of a reformer according to a third embodiment of the present invention.

FIG. 7 shows a third embodiment of the present invention. Unlike the second embodiment, the reformer of the third embodiment adopts a construction in which methane is supplied together with air from the blowout pipe 22 into the reformer 10. With the ratio $O_2/CH_4$ between oxygen and methane supplied from the blowout pipe 22 being set to about 0.5, the case (FIG. 8A) where the exothermic partial oxidation reforming reaction is caused in the central area will be described. Also, with the ratio $O_2/CH_4$ being set to about 2.0, the case (FIG. 9A) where methane burns completely in the central area will be described.

Figure 8A:
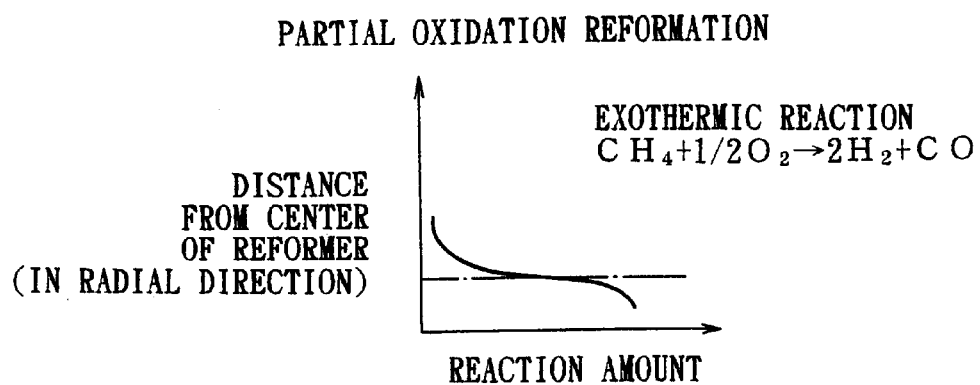
FIG. 8A is a graph showing distribution of a reaction amount of a partial oxidation reaction in the reformer according to the third embodiment.
Figure 8B:
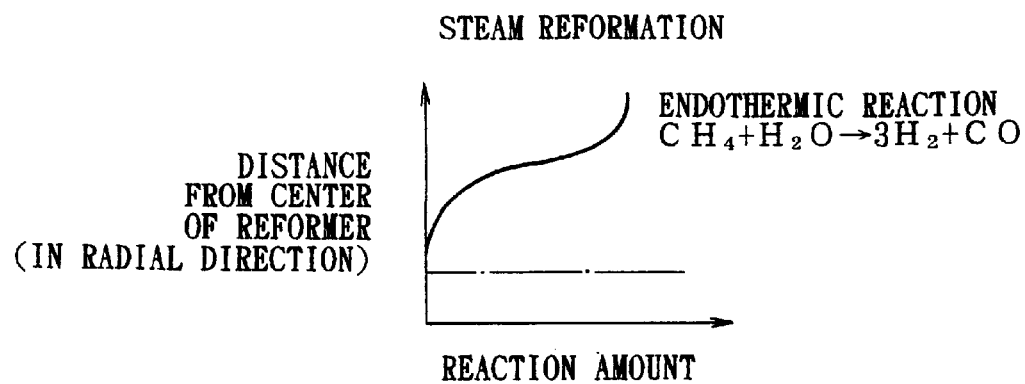
FIG. 8B is a graph showing distribution of a reaction amount of a steam reforming reaction in the reformer according to the third embodiment.

FIG. 8A shows distribution of reaction of the partial oxidation reformation inside the reformer 10 with the ratio $O_2/CH_4$ between oxygen and methane supplied from the blowout pipe 22 being set to about 0.5. FIG. 8B shows distribution of reaction of the steam reformation inside the reformer 10 with the ratio $O_2/CH_4$ being set to about 0.5. In this case, since air is supplied together with methane from the blowout pipe 22, as shown in FIG. 8A, oxygen can come into contact with methane in an area closer to the center of the reformer 10. Thus, the area where the partial oxidation reforming reaction mainly occurs, namely the central area 14, is narrowed and located closer to the center than the previous embodiment. Accordingly, the high-temperature area also is confined closer to the center of the chamber. In the process of diffusion to the outer peripheral area 16, this reaction heat is absorbed in the steam reforming reaction occurring in the outer peripheral area 16. Thus, the temperature in the vicinity of the outer wall area 16 is kept relatively low. In this manner, since the high-temperature area is limited to a narrower central area, it is possible to even better prevent the outer wall from being exposed to a high temperature.

Figure 9A:
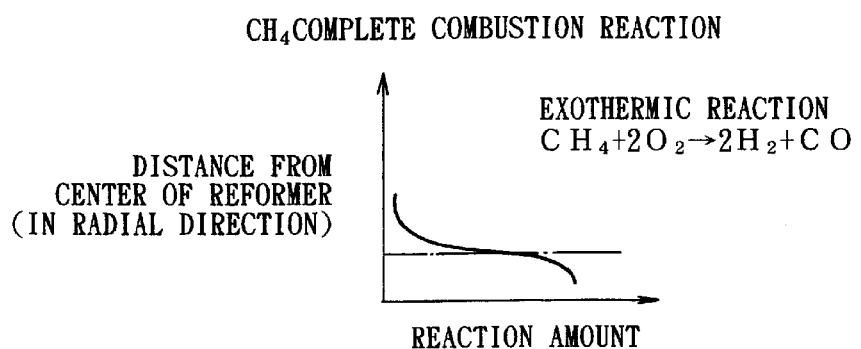
FIG. 9A is a graph showing distribution of a reaction amount of a complete combustion reaction of methane in the reformer according to the third embodiment.
Figure 9B:
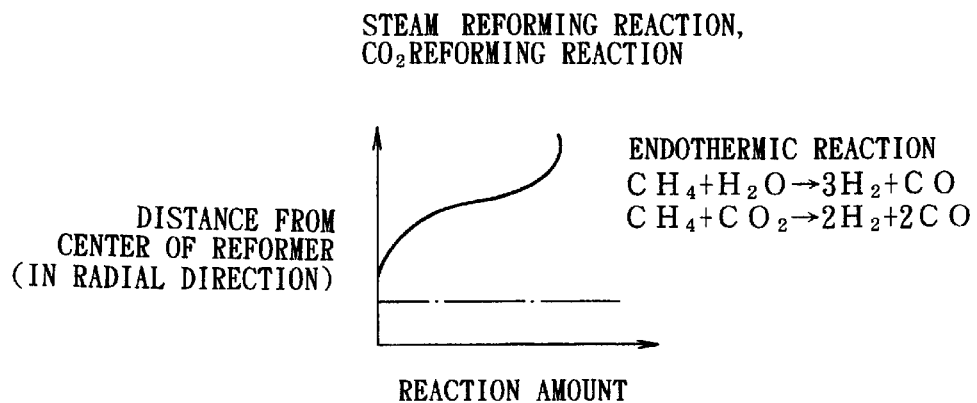
FIG. 9B is a graph showing distribution of a reaction amount of a $CO_2$ reforming reaction and a steam reforming reaction of methane.

In a similar construction, FIG. 9A shows distribution of reaction of the partial oxidation inside the reformer 10 in the case where the ratio $O_2/CH_4$ between methane and oxygen is set to about 2. FIG. 9B shows distribution of reaction of the steam reformation inside the reformer 10 in the case where the ratio $O_2/CH_4$ is set to about 2. Methane and oxygen are supplied into the reformer 10 from the blowout pipe 22 such that the ratio $O_2/CH_4$ becomes equal to about 2. Under such a condition where a profusion of oxygen exists, as shown in FIG. 9A, methane burns completely in the vicinity of the central area 14. The reaction at the time of complete combustion of methane is represented by a formula (5) shown below.

$$CH_4+2O_2 \rightarrow 2H_2O+CO_2 \quad (5)$$

In the aforementioned formula (5), if methane has burnt completely, there is no hydrogen produced, but reaction heat greater than that of the partial oxidation reaction is produced instead. This reaction heat is utilized to perform the steam reforming reaction on the side of the outer peripheral area 16, and the steam reforming reaction is promoted. Further, $CO_2$ is produced through complete combustion of methane, and the $CO_2$ thus produced is also utilized to perform the reforming reaction of methane. That is, on the side of the outer peripheral area, a $CO_2$ reforming reaction represented by a formula (6) shown below occurs simultaneously with the steam reforming reaction. This $CO_2$ reforming reaction is also an endothermic reaction, and the reaction is promoted with the aid of the reaction heat generated through complete combustion of methane in the center of the chamber.

$$CH_4+CO_2 \rightarrow 2H_2+2CO \quad (6)$$

In this manner, a source of heat is produced through complete combustion of methane in the central area 14. This amount of heat is utilized by being absorbed in the steam reforming reaction occurring in the outer peripheral area 16, so that the reformation into hydrogen is promoted. At the same time, the $CO_2$ produced through complete combustion of methane causes the $CO_2$ reforming reaction of methane. Hence, in the reformer of this embodiment, the efficiency of producing hydrogen in the outer peripheral area 16 can be enhanced.

As described hitherto, the reaction in the central area 14 of the reformer is not always limited to the partial oxidation reaction of methane. Instead, the reaction heat required for the steam reforming reaction may be produced through complete combustion of methane.

Figure 10:
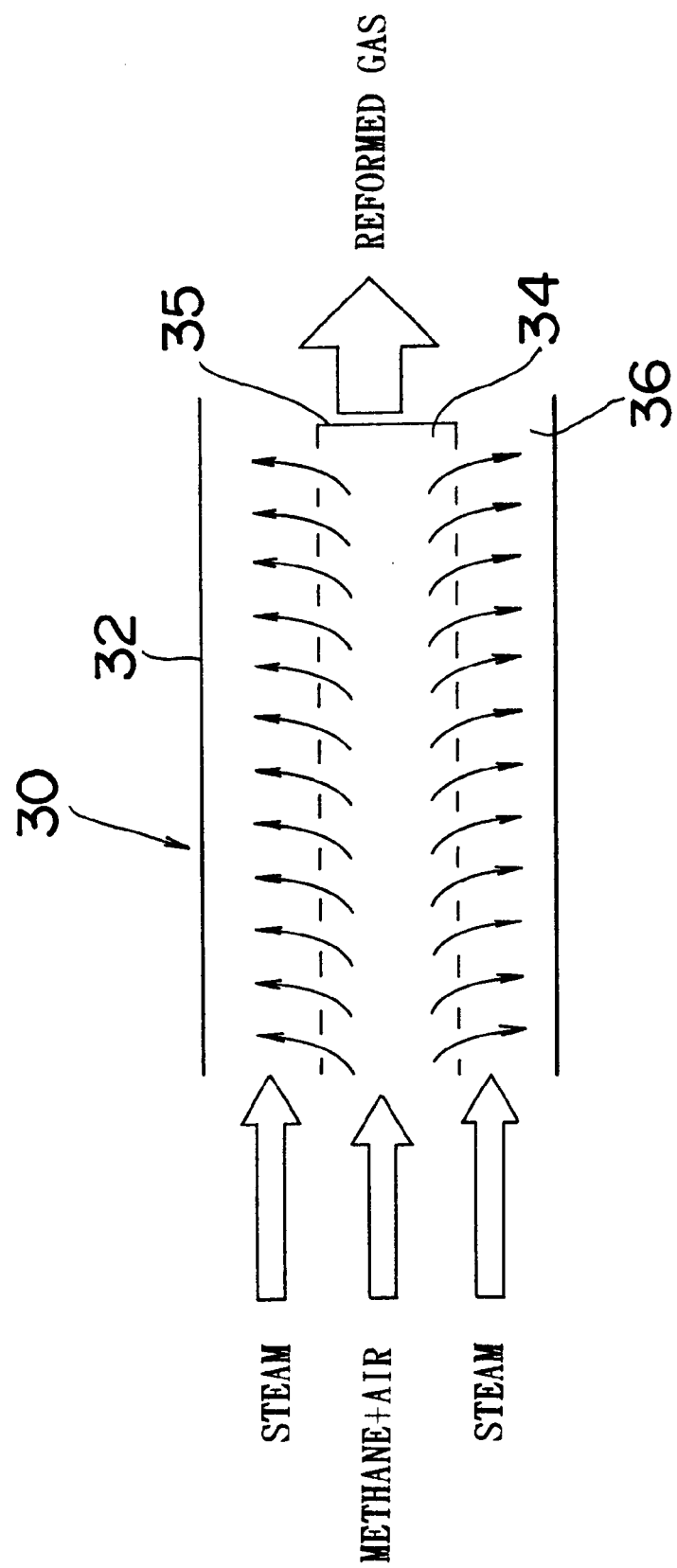
FIG. 10 shows an internal structure of a reformer according to a fourth embodiment of the present invention.

FIG. 10 shows a reformer 30 according to a fourth embodiment of the present invention. As shown in FIG. 10, in this embodiment, a blowout pipe 35 is provided so as to surround a central area 34 of the reformer. While air and methane are supplied to the blowout pipe 35, only steam is fed from an outer peripheral portion of an inlet of the reformer 30 toward the inside of the reformer.

Figure 11A:
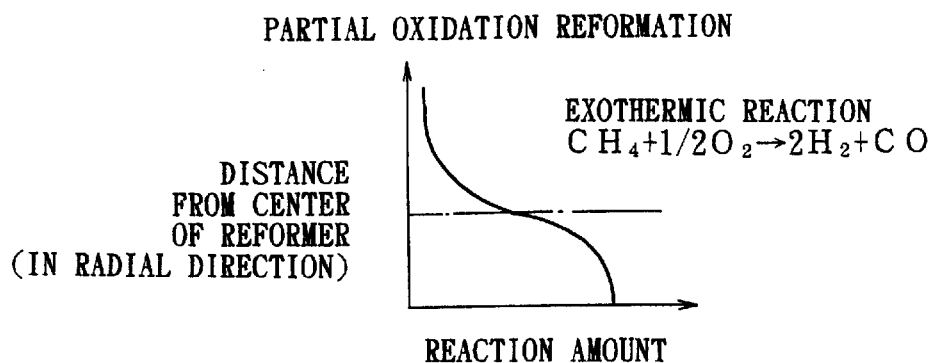
FIG. 11A is a graph showing distribution of a reaction amount of a partial oxidation reforming reaction in the reformer according to the fourth embodiment of the present invention.
Figure 11B:
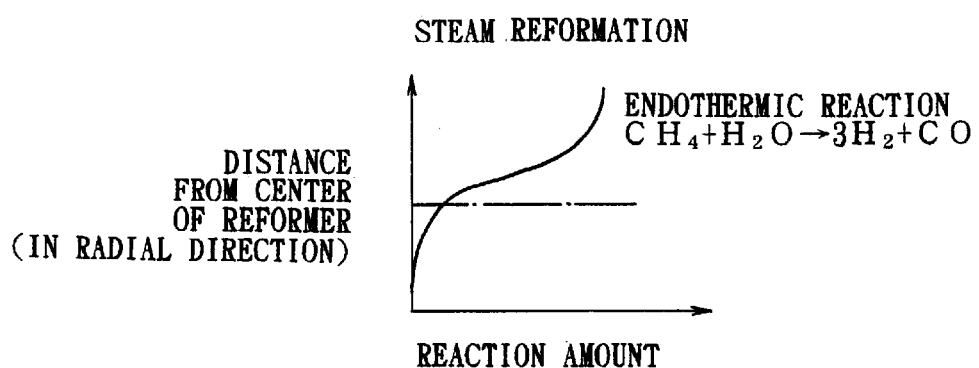
FIG. 11B is a graph showing distribution of a reaction amount of a steam reforming reaction in the reformer according to the fourth embodiment.

FIG. 11A shows distribution of reaction of the partial oxidation reformation in the reformer 30 with the ratio $O_2/CH_4$ between oxygen and methane blown out from a blowout pipe 35 being set to about 0.43. Further, FIG. 11B shows distribution of reaction of the steam reformation in the reformer 30 with the ratio $O_2/CH_4$ being set to about 0.43.

Figure 12:
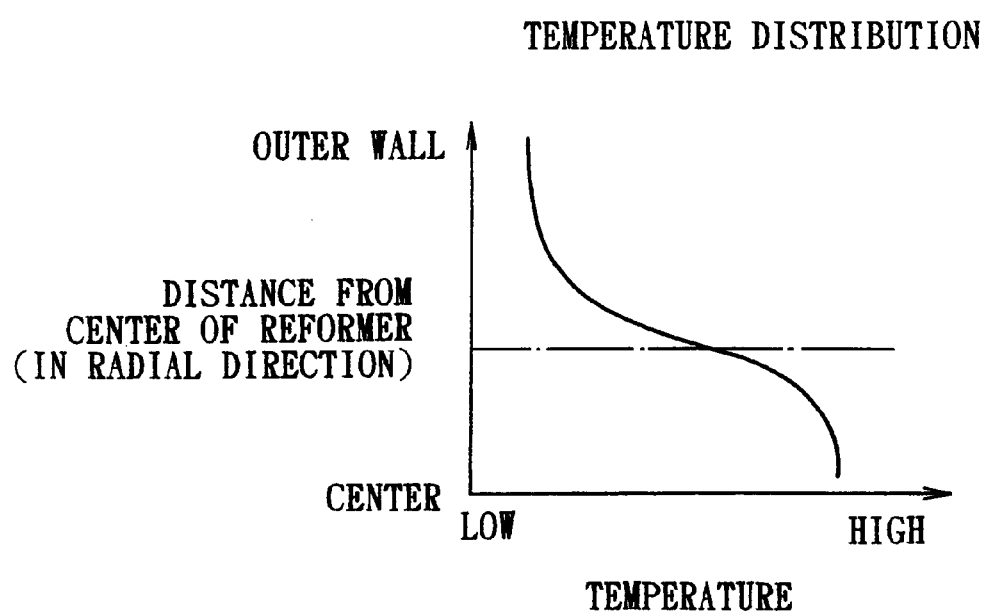
FIG. 12 is a graph showing distribution of temperature in the reformer according to the fourth embodiment.

As shown in FIG. 11A, in the central area 34 of the reformer 30, methane is subjected to the partial oxidation reformation by the oxygen that has been fed together with the methane. Thus, the partial oxidation reaction proceeds in the central area 34. In an outer peripheral area 36 of the reformer 30, the methane that remains as unreformed in the central area 34 is fed from the blowout pipe 35 together with the reaction heat produced in the partial oxidation reformation. Because steam has been supplied to the outer peripheral area 36, the steam reformation is promoted by the methane thus fed as a raw material and the reaction heat. The steam reforming reaction is an endothermic reaction. Therefore, as shown in FIG. 12, the temperature falls in the outer peripheral area 36, and the temperature in the vicinity of the outer wall 32 that is located furthest from the central area 34 is kept low.

Figure 13:
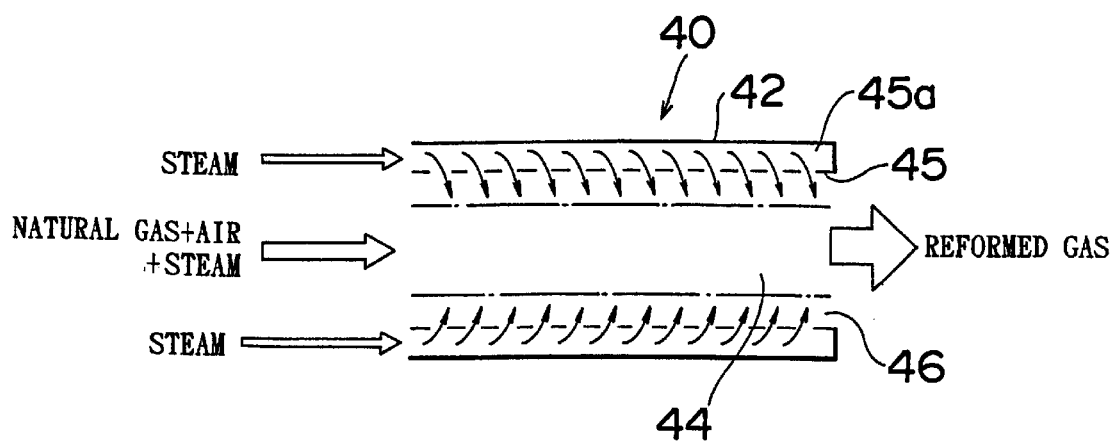
FIG. 13 shows an internal structure of a reformer according to a fifth embodiment of the present invention.

FIG. 13 shows a reformer 40 according to a fifth embodiment of the present invention. In the aforementioned embodiment, the steam reformation is caused in the outer peripheral area so as to lower a temperature thereof. However, the more distant an area is located from the central area, the more drastically the efficiency of the steam reformation in that area tends to decrease. In order to compensate for such a decrease in efficiency of the steam reforming reaction in the vicinity of the outer wall, steam is supplied to the vicinity of the outer wall so as to raise a partial pressure of steam at that location. In this manner, the steam reformation is promoted.

More specifically, as shown in FIG. 13, the reformer 40 is equipped with an inner tube 45 made of a material permeable to steam and the like along an outer wall 42. A steam supplying area 45a for supplying steam is formed between the inner tube 45 and the outer wall 42.

Figure 14:
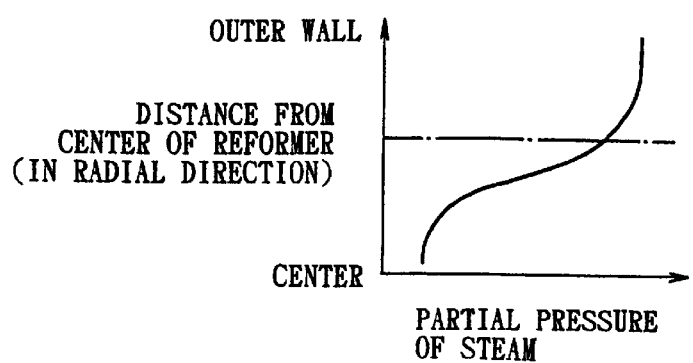
FIG. 14 is a graph showing distribution of partial pressure of steam in the reformer according to the fifth embodiment.

Accordingly, almost all the steam is supplied to the steam supplying area 45a, whereas natural gas as a raw material, air and the remaining steam are supplied to the inside of the inner tube 45. The steam supplied to the steam supplying area 45a passes through the inner tube 45 because of its own pressure and flows toward the central area 44. Accordingly, the partial pressure of steam in the reformer 40 forms a distribution pattern as shown in FIG. 14. That is, the partial pressure of steam is high in the outer peripheral area 46 and low in the central area 44.

When the reformation of the hydrocarbon raw material is performed in such a state of the reformer 40, the raw material is first oxidized in the central area 44 by the oxygen that has been supplied. Thus, hydrogen is produced and reaction heat is generated. The more distant an area is located from the center of the inner tube 45 of the reformer 40 toward the outer wall, the lower the concentration of oxygen in that area becomes, and the higher the concentration of steam in that area becomes. Hence, the steam reforming reaction is promoted rather than the partial oxidation reaction, and the steam reforming reaction produces hydrogen and absorbs part of the heat. Thus, the more distant an area is located from the center of the inner tube 45 of the reformer 40 toward the outer wall, the more actively the steam reforming reaction in that area is promoted. Hence, the temperature in the outer peripheral area 46 tends to fall.

Thus, when the temperature in the outer peripheral area is low, the efficiency of the steam reforming reaction decreases. However, according to the reformer 40 of the present invention, the partial pressure of steam in the outer peripheral area is kept high. Thus, this partial pressure of steam promotes the steam reforming reaction. In this manner, by enhancing a partial pressure of steam while maintaining the outer peripheral area 46 at a low temperature, the steam reforming reaction is promoted, and the efficiency in producing hydrogen can be improved.

As described hitherto, according to the present invention, the amount of supply of oxygen is reduced from the center toward the outer wall in the internal space of the reformer. On the other hand, the amount of supply of steam is reduced from the inner surface of the outer wall toward the center in the internal space of the reformer. Thereby, the partial oxidation reaction is performed in the central area, and the steam reformation is performed in the outer peripheral area surrounding the central area. In this manner, the partial oxidation reaction, which is an exothermic reaction, is performed in the central area, and the steam reforming reaction, which is an endothermic reaction, is performed in the outer peripheral area. Consequently, the reaction heat produced in the central area is absorbed as a necessary amount of heat in the steam reforming reaction when diffusing toward the inner surface of the outer wall. Thus, it becomes possible to keep the temperature of the outer peripheral area low.

Accordingly, the efficiency of the reforming reaction is improved by forming a suitable distribution pattern of temperature inside the reformer without employing an expensive heat-resistant material for the outer wall.

While the present invention has been described with reference to preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the present invention.

What is claimed is:

1. A reformer that combines a steam reforming reaction, in which a hydrocarbon raw material is reformed into hydrogen using steam, with a partial oxidation reforming reaction, in which a hydrocarbon raw material is reformed into hydrogen using oxygen, in order to reform the hydrocarbon raw material and produce a fuel gas containing hydrogen, the reformer comprising:

an outer wall defining an internal chamber in which the steam reforming reaction and the partial oxidation reforming reaction occur, the internal chamber having a central area located adjacent to a center of the internal chamber and an outer peripheral area located adjacent to an inner surface of the outer wall and located radially outward of the central area, the central area and the outer peripheral area are not radially separated by any fluid impermeable barriers, such that radial flow paths for fluids exist between the central area and the outer peripheral area;

a hydrocarbon raw material supply means for supplying a hydrocarbon raw material into the internal chamber;

a steam supply means for supplying steam into the internal chamber such that, due to passage of the steam along the radial flow paths, an amount of the steam increases in the internal chamber from the center of the internal chamber toward the inner surface of the outer wall of the internal chamber; and an oxygen supply means for supplying oxygen into the internal chamber such that, due to passage of the oxygen along the radial flow paths, an amount of the oxygen increases in the internal chamber from the inner surface of the outer wall of the internal chamber toward the center of the internal chamber, wherein the partial oxidation reforming reaction primarily occurs in the central area of the internal chamber and the steam reforming reaction primarily occurs in the outer peripheral area of the internal chamber.

2. The reformer according to claim 1, wherein:

the steam supply means supplies the steam to an area adjacent to the inner surface of the outer wall; and the oxygen supply means supplies oxygen to an area adjacent to the center of the internal chamber.

3. The reformer according to claim 1, wherein:

the oxygen supply means includes a blowout tube that extends into the central area and supplies oxygen through blowout in the center of the internal chamber; and the oxygen is supplied from the center of the internal chamber through outlets located in a radially outer surface of the blowout tube toward the inner surface of the outer wall.

4. The reformer according to claim 1, wherein: the steam supply means supplies the steam having a high partial pressure ro an area adjacent to the inner surface of the outer wall.

5. The reformer according to claim 1, wherein:

an internal temperature of the reformer is set to a temperature at which the reforming reactions occur in order to initiate the reforming reactions.

6. A fuel reforming method for performing, in a reformer, a steam reforming reaction, in which a hydrocarbon raw material is reformed into hydrogen using steam, and a partial oxidation reforming reaction, in which a hydrocarbon raw material is reformed into hydrogen using oxygen, the reformer having an outer wall defining an internal chamber in which the steam reforming reaction and the partial oxidation reforming reaction occur, the internal chamber having a central area located adjacent to a center of the internal chamber and an outer peripheral area located adjacent to an inner surface of the outer wall and located radially outward of the central area, the central area and the outer peripheral area are not radially separated by any fluid impermeable barriers, such that radial flow paths for fluids exist between the central area and the outer peripheral area, the method comprising:

increasing an amount of steam in the internal chamber from the center of the internal chamber toward the inner surface of the outer wall by flowing the steam along the radial flow paths;

increasing an amount of oxygen in the internal chamber from the inner surface of the outer wall toward the center of the internal chamber by flowing the oxygen along the radial flow paths; and causing the partial oxidation reforming reaction to occur primarily at the central area of the internal chamber, and the steam reforming reaction to occur primarily at the outer peripheral area of the internal chamber.

7. The fuel reforming method according to claim 6, wherein:

the amount of the steam is increased from the center of the internal chamber toward the inner surface of the outer wall by supplying the steam to an area adjacent to the inner surface of the outer wall of the internal chamber; and the amount of the oxygen is increased from the inner surface of the outer wall toward the center of the internal chamber by supplying the oxygen to an area adjacent to the center of the internal chamber.

8. The fuel reforming method according to claim 6, wherein:

a blowout tube extends into the central area and supplies the oxygen through blowout in the center of the internal chamber of the reformer; and the oxygen is supplied from the center of the internal chamber of the reformer through outlets located in a radially outer surface of the blowout tube toward the inner surface of the outer wall.

9. The fuel reforming method according to claim 6, wherein:

the amount of the steam is increased from the center of the internal space toward the inner surface of the outer wall by supplying the steam having a high partial pressure to an area adjacent to the inner surface of the outer wall.

10. The fuel reforming method according to claim 6, wherein:

the partial oxidation reforming reaction and the steam reforming reaction are started by setting an internal temperature of the reformer to a temperature at which the reforming reactions occur.

11. A fuel cell system comprising:

the reformer according to claim 1; and a fuel cell that generates electricity by being supplied with reformed gas produced through the reforming reactions that occur in the reformer.

12. The fuel cell system according to claim 11, wherein:

the steam supply means supplies the steam to an area adjacent to the inner surface of the outer wall; and the oxygen supply means supplies the oxygen to an area adjacent to the center of the internal chamber.

13. The fuel cell system according to claim 11, wherein:

the oxygen supply means includes a blowout tube that extends into the central area and supplies oxygen through blowout in the center of the internal chambers; and the oxygen is supplied from the center of the internal chamber through outlets located in a radially outer surface of the blowout tube toward the inner surface of the outer wall.

14. The fuel cell system according to claim 11, wherein:

the steam supply means supplies the steam having a high partial pressure to an area adjacent to the inner surface of the outer wall.

15. The fuel cell system according to claim 11, wherein:

an internal temperature of the reformer is set to a temperature at which the reforming reactions occur in order to initiate the reforming reactions.

\* \* \* \* \*